(12) United States Patent
Kacharia et al.

(10) Patent No.: US 9,639,670 B2
(45) Date of Patent: May 2, 2017

(54) ON-DEMAND CUSTOM ENTITLEMENT CARDS FOR PRODUCTS AND SERVICES

(71) Applicant: Microsoft Corporation, Redmond, WA (US)

(72) Inventors: Jignesh Kacharia, Redmond, WA (US); Anand Doshi, Bellevue, WA (US); Keerti Rane, Bellevue, WA (US); Tulasi Pratipati, Redmond, WA (US); Peter Richard Ricci, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 819 days.

(21) Appl. No.: 13/918,763

(22) Filed: Jun. 14, 2013

(65) Prior Publication Data

US 2014/0373175 A1     Dec. 18, 2014

(51) Int. Cl.
  *G06F 21/00*     (2013.01)
  *G06F 21/10*     (2013.01)
  *G06Q 30/06*     (2012.01)

(52) U.S. Cl.
  CPC ....... *G06F 21/105* (2013.01); *G06Q 30/0621* (2013.01)

(58) Field of Classification Search
  CPC .............................. G06Q 30/00; G06F 21/105
  See application file for complete search history.

(56) References Cited

U.S. PATENT DOCUMENTS

| 5,784,463 A | 7/1998 | Chen et al. |
|---|---|---|
| 8,286,229 B2 | 10/2012 | Bodin et al. |
| 2009/0077382 A1 | 3/2009 | Dupre |
| 2012/0316947 A1* | 12/2012 | Quinlan ................. G06Q 30/02 705/14.23 |
| 2013/0097006 A1 | 4/2013 | Evans et al. |

OTHER PUBLICATIONS

"Brokered Authentication: Security Token Service (STS)", Retrieved at <<http://msdn.microsoft.com/en-us/library/ff650503.aspx>> Dec. 2005, pp. 15.
"Using OAuth 2.0 to Access Google APIs", Retrieved at <<https://developers.google.com/accounts/docs/OAuth2>> Mar. 3, 2012, pp. 11.

(Continued)

*Primary Examiner* — Mary Cheung
(74) *Attorney, Agent, or Firm* — Talem IP Law, LLP

(57) ABSTRACT

An entitlement card can be assigned a product key real-time to provide a custom order of benefits including product and/or service, amount, and time. A method facilitating product key assignment for an entitlement can include receiving a request for activating a custom entitlement product key from, for example, a point of purchase. The request includes a request for particular benefits to a redeemer, including the particular product and/or service to be provided and the quantity and time period for the product and/or service. The method further includes assigning the benefits to the product key at the time of the request and activating the product key, which may be later redeemed for the assigned benefits.

13 Claims, 5 Drawing Sheets

(56) References Cited

OTHER PUBLICATIONS

McLaughlin, Kevin, "VMware Rolls Out Token-Based Purchasing System for Enterprises", Retrieved at <<http://www.crn.com/news/virtualization/240008868/vmware-rolls-out-token-based-purchasing-system-for-enterprises.htm>> Oct. 10, 2012, pp. 4.
"Activation Website", Retrieved at <<http://www.vcatechnology.com/public/downloads/Activation-Website-User-Manual-2.1.pdf>> Retrieved Date: May 14, 2013, pp. 24.
George, et al., "Accessing Distributed Services with One Time Token Generation", In International Journal of Computer Science & Engineering Technology, vol. 4, Issue 2, Feb. 2013, pp. 5.
Satoh, et al., "Single Sign on Architecture with Dynamic Tokens", In Proceedings of International Symposium on Applications and the Internet, Jan. 26, 2004, pp. 4.
"Visa Prepaid Gift Cards", Retrieved at <<http://www.visa.co.uk/en/products/visa_prepaid/gift_cards.aspx>> Retrieved Date: May 14, 2013, pp. 2.
"International Search Report and Written Opinion Issued in PCT Patent Application No. PCT/US2014/041610", Mailed Date: Mar. 10, 2015, 7 Pages.

\* cited by examiner

ON-DEMAND CUSTOM ENTITLEMENT CARDS FOR PRODUCTS AND SERVICES

BACKGROUND

As software products are moving from a perpetual license tied to a single machine or being "on premise" to online subscription services that are associated with a particular user or tenant, there becomes a need for infrastructure to support sales outside of online channels, license management, and purchase paradigms. Entitlement cards and/or associated token keys (or "tokens") provide a way to purchase or license software products through retail outlets as well as multitier distribution channels.

Presently, entitlement cards are generated for a specific service or product and for a specific amount (of licenses and time). For example, an entitlement card to a productivity suite of products such as MICROSOFT OFFICE365 may be in the form of one license for one year for a specified cost or in the form of multiple licenses at intervals of 5, 25, and 50 licenses for one year for a specified cost.

BRIEF SUMMARY

Customizable entitlement cards and systems for implementing custom entitlement cards are described. An entitlement card may function as the packaging of a token providing permission to access a service or product. As described in detail herein, a product key, or token, which may be embodied in the form of an entitlement card, is assigned an offer on-demand (such as at the point of sale).

The offer includes a product (or service), quantity (or number of licenses), and a period of time. An entitlement card can be assigned a product key real-time to provide a custom order of product and/or service, amount, and time. The preset and bundled offers of traditional entitlement cards can be replaced with custom offers that enable a service or product provider to activate custom entitlements from a single token.

Tokens (a license product key) can be assigned to an offer at the time of activation to provide a custom order of product, time, and number of licenses or subscriptions. A non-assigned token may be associated with an entitlement card. At a point of purchase, the entitlement card is configurable on activation (and assignment of a custom offer to the token) so that a custom offer may be redeemed.

A method for managing tokens includes receiving a request for activating a custom entitlement card, where the request includes product, time and/or subscriptions/quantity. Once the token management system receives the request, the token management system can assign a token an offer corresponding to the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
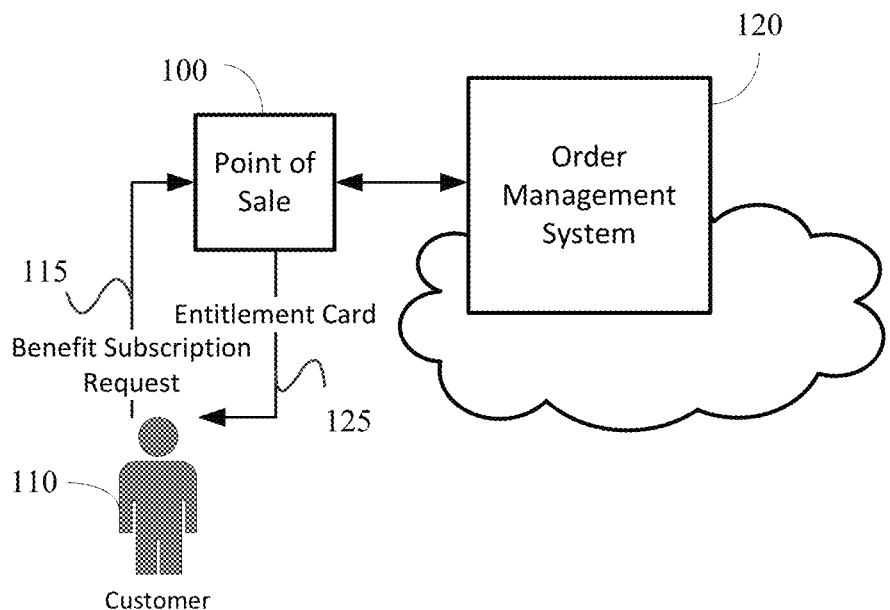
FIG. 1 shows a diagram of an operating environment in which certain embodiments may be carried out.

Entitlement cards, systems for implementing entitlement cards, and methods of managing user licenses and terms in an online service are described.

Certain embodiments contemplate using entitlement cards through offline and online retailers to sell subscriptions for online services. The entitlement cards provide product keys for an entitlement. According to various embodiments, the entitlements to which the described entitlement cards are directed involve subscriptions to an online service. As described in detail herein, each entitlement card is configurable on activation so that a custom offer may be redeemed.

A customer can take the entitlement card having the product key and redeem a requested product from the online service to obtain or renew a subscription to the online service. Using the software as a service model, the online service subscription is associated with a user (or organization) account and not a device, package, or product key.

Entitlement cards of certain implementations generally involve a substrate on which a product key, or token, is disposed. The substrate may be a card, box, paper or other physical implement on which a product key is readable. The product key may be human readable (by being printed or stamped) or machine readable (such as by magnetic strip or radio frequency transmission). In some cases a product key can be provided to a customer in a form that is not on a physical card or substrate. For example, the product key may be sent to a customer in a message, email, or by some other form of communication. Thus, an entitlement card may be a physical card or a metaphor used to describe a key in a manner understandable by a human user and the terms "token(s)," "product key(s)," "key(s)," and "entitlement card(s)" may be used interchangeably herein.

Gift Cards, prepaid cards, and other entitlement cards are commonly sold in retail outlets as well as through multitier distribution channels. Unless a gift card is for the retail outlet where the point of sale is occurring, gift cards for third party products or services are sold at designated values. Presently, a service or product provider receives prepaid cards for a specific service or product and designated amount (and time). This limits the service or product provider to only a few combinations for product/service and amounts due to, for example, limited shelf space at a retail outlet for multiple card values (and related products) and the operational difficulties in generating cards with all permutations that may be desired by a customer.

Often, to address the limited shelf space and operational difficulties with generating all potential permutations, the service or product provider defines predefined bundles. For example, entitlement cards to a 1 license pack; a 5 license pack; a 25 license pack and a 50 license pack of a given service or software product are generated. These entitlement cards tend to be specific to each service or product offered through this business model. This solution, however, pushes the complexity to the customer. If a customer wants 66 licenses of the service or product then they will need to buy one 50 license card; three 5 license cards and one 1 license card. Then, to redeem the 66 licenses of a service or product, the customer enters 5 different tokens.

On-demand custom entitlement cards are provided that enable a service or product provider to activate custom entitlements from a single token (and in some cases provide both a product and a service using a single token). That is, the entitlement associated with a token may be assigned at the time of purchase and allows for the service or product as well as the licenses (e.g., quantity) to be variables. Thus, when the customer buys 66 licenses of a specific service or product, the token is assigned in real time at the service or product provider. And the customer gets 1 card for 66 licenses for that particular service or product.

The redemption of an entitlement card (and its product key) as described herein may be applicable to any form of conveying to a customer the product that they purchased and its corresponding product key to enable redemption of the online service or product.

Once purchased, the entitlement card represents an offer term for a specified number of user licenses for a subscription to a specified online service or product for a specified period of time. For example, an entitlement card may be a 1 year subscription to an online service for 1 user (a "1 year-1 user subscription"). Until purchase (or benefit request), an entitlement card or token may be unassigned.

Although an entitlement card of certain embodiments may have a monetary value associated with it, the entitlement card of certain embodiments is not redeemable for money or points or other form of credit; is not used to store credit; and is not reloadable. Rather, the entitlement card for online services represents a subscription for one or more specified user licenses (or products). As opposed to a gift card that has cash value assigned at the point of purchase, an entitlement card of various implementations can have a non-cash value benefit of a product/service, time period, and amount assigned at the point of purchase. That is, a customer can purchase an entitlement and the benefit remains until it is used regardless of the change in price over time should the cost of the benefits increase before the entitlements are redeemed.

By virtue of assigning the benefits or goods due to customer, the price of the benefits may vary or change in the future, but those benefits remain the same. To illustrate this point, a customer may purchase an entitlement card (activate a token) for $10 for one license of one product. In the case where the customer waits to redeem the entitlement, for example for 2 years, the benefit remains even if the price has increased. That is, when the customer redeems the entitlement, the customer receives the one license of the one product regardless of the new cost.

Further, the benefits of the entitlement may be specified at the time of purchase without limitations from pre-assigned tokens.

Implementations separate the token activation, quantity assignment and service or product assignment from the generating and distribution process of tokens associated with an entitlement.

According to certain implementations, token activation, quantity assignment, and service assignment is made available at the time of purchase. The token may be inactive and not assigned a benefit until the time of purchase. Moreover, the token may not be previously assigned to a particular product or service (facilitating the use of a token for virtually any product or service).

An application programming interface (API) can be provided to enable token activation and dynamic assignment of the quantity and particular service or product desired by a customer. Subsequent to activation, a customer may redeem the entitlements and receive the specified quantity and service or product.

FIG. 1 shows a diagram of an operating environment in which certain embodiments may be carried out. Referring to FIG. 1, at a point of sale 100, a customer 110 can purchase or receive an entitlement card (or other instrument providing a product key). The point of sale 100 may be online, in a store, at a kiosk, or any suitable location having a computing device from which a benefit subscription request 115 as received by the customer can be made to an order management system 120. The point of sale 100 may be used to activate the entitlement card and assign the benefits due to the customer (via the order management system 120. For example, the point of sale 100 can call a service hosted by the order management system 120. As part of the call, the point of sale 100 can indicate that a card is sold and the benefits due to the customer (based on the benefit subscription request 115).

The order management system 120 can receive the request, including information regarding desired product(s), amount, and length of time (as non-limiting options). The order management system 120 activates the card and assigns the requested benefits to the token (or other unique key) in the system. Instead of pre-assigned benefits that a customer purchases at the point of sale, implementations enable a per card assignment when customer expresses their desire for a particular benefit. Once assigned, the order management system 120 can inform the point of sale 100 that the card is activated and the customer can receive a custom entitlement card 125 that can be redeemed for the requested benefits.

In some implementations, the order management system 120 may be embodied as part of a cloud service or a web service for facilitating entitlement card customization and token activation.

The cloud or web services (for facilitating entitlement card customization and token activation), including the order management system 120 may be implemented using one or more physical and/or virtual servers communicating over a network. The network can include, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure. A client organization that is served by a cloud service and shares resources controlled or managed by the cloud service with other client organizations can be referred to as a tenant.

Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), XML, JavaScript Object Notation (JSON), Representational state transfer (REST) protocols, and SOAP (originally an acronym for simple object access protocol).

A point of sale 100 device may access the order management system 120 via one or more of the web protocols and data formats described above.

Figure 2:
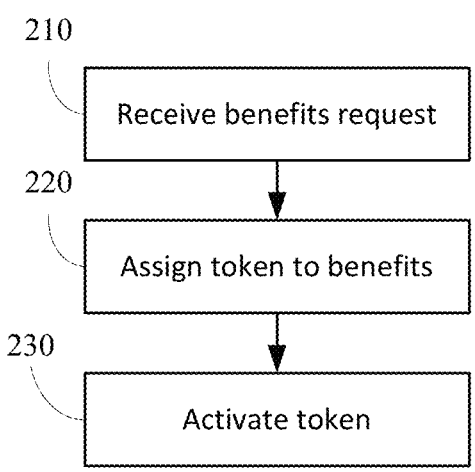
FIG. 2 shows an entitlement card assignment process according to an embodiment.

FIG. 2 shows an entitlement card assignment process according to an embodiment. An order or token management system (120) can receive a request (210) for activating a custom entitlement product key. The request can include benefits to a redeemer of the entitlement. The benefits can be specified product(s) and quantity or specified service(s), number of subscriptions, and length of time.

Based on the request, the system can assign the requested benefits to the custom entitlement product key (220) and activating the custom entitlement product key (230). In some cases, the assignment of the benefits can activate the key.

After the custom entitlement product key is activated, a redeemer (the customer or another person) may redeem the benefits through any suitable channel. For example, the redeemer may access an online service portal (e.g., via a web browser) for the product and/or service to which the entitlement is directed. From the portal, the redeemer may enter the product key information and redeem the benefits.

FIGS. 3A-3D illustrate activation scenarios of example implementations. It should be understood that the example implementations are merely to illustrate some scenarios in which a custom entitlement card may be activated and should not be construed to limiting activation to the illustrated examples.

Figure 3A:
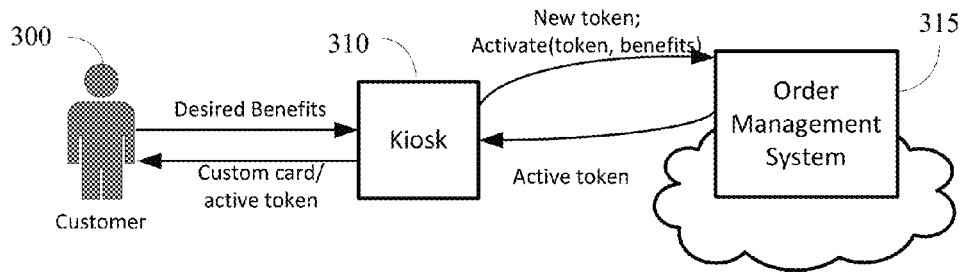
FIGS. 3A-3D illustrate activation scenarios of example implementations.

Referring to FIG. 3A, a customer 300 may obtain a custom entitlement card at a kiosk 310. The customer 300 may enter information regarding a custom benefit of a service and/or product via the kiosk 310 (which may present a user interface for ease of purchase). The kiosk 310 can call (e.g., using a token activation API) an order management system 315 with a request for a token (or other form of product key) and that the token be activated with the benefits that the customer 300 entered via the kiosk user interface. If the Kiosk 310 has a database of inactive tokens, then the request to the token management system 315 may be to activate one of the inactive tokens and assign the benefit to that token. The token management system 315 can provide an active token (or activate a token) that is associated with the requested benefits, and the kiosk can vend an entitlement card with the active token that is associated with the requested benefits. In some cases, the kiosk 310 may email or text the token to the customer.

Figure 3B:
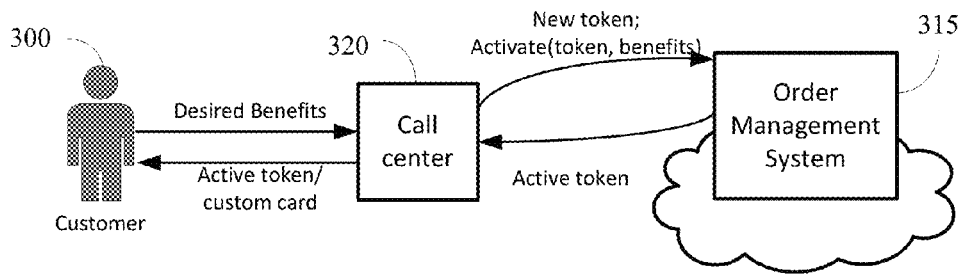

Referring to FIG. 3B, a customer 300 may obtain a custom entitlement card (or product key) via a call center 320. The customer 300 may call the call center 320 (by phone, cellular, or voice over IP) and speak with a representative or an automated service to provide information regarding a requested custom benefit of a service and/or product. The call center 320 can communicate (e.g., via the token activation API) with the order management system 315 with a request for a token (or other form of product key) and that the token be activated with the benefits that the customer 300 requested by phone.

If the call center 320 has a database of inactive tokens, then the request to the token management system 315 may be to activate one of the inactive tokens and assign the benefit to that token. The token management system 315 can provide an active token (or activate a token) that is associated with the requested benefits. The representative at the call center 320 can inform the customer of the token information by phone, text, email, or mail and may even mail an entitlement card (which may be an electronic or physical card).

In some cases, the customer may have purchased or received an entitlement card with an inactive token. In one such case, the customer may provide the inactive token information to the call center 320, which then provides the inactive token information to the token management system 315 to have that token assigned to the requested benefits. The token management system 315 can activate the token and the customer's entitlement card can be considered activated and available for redemption.

Figure 3C:
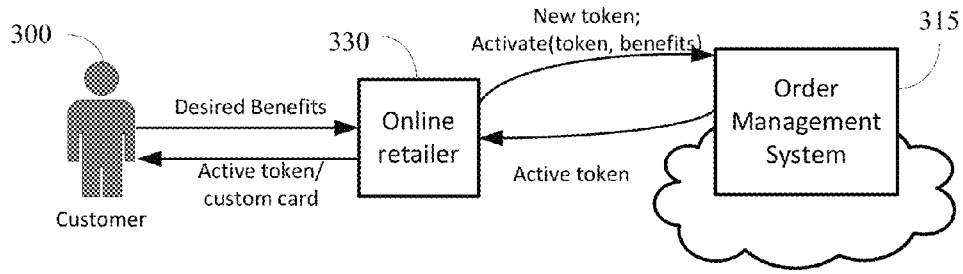

Referring to FIG. 3C, a customer 300 may obtain a custom entitlement card (or product key) via an online retailer 330. The customer 300 may access the online retailer 330 via a web browser or other application on a computing device to provide information regarding a requested custom benefit of a service and/or product. The online retailer 330 can communicate (e.g., server to server via the token activation API) with the order management system 315 with a request for a token (or other form of product key) and that the token be activated with the benefits that the customer 300 requested.

If the online retailer 330 has a database of inactive tokens, then the request to the token management system 315 may be to activate one of the inactive tokens and assign the benefit to that token. The token management system 315 can provide an active token (or activate a token) that is associated with the requested benefits. The online retailer 330 can inform the customer of the token information by displaying the information at the customer's computing device or send the information by phone, text, email, or mail and may even mail an entitlement card (which may be an electronic or physical card).

In some cases, the customer may have purchased or received an entitlement card with an inactive token. In one such case, the customer may provide the inactive token information to the online retailer 330, which then provides the inactive token information to the token management system 315 to have that token assigned to the requested benefits. The token management system 315 can activate the token and the customer's entitlement card can be considered activated and available for redemption.

Figure 3D:
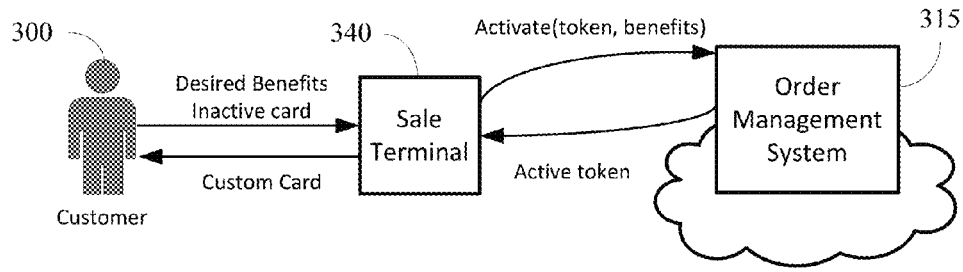

Referring to FIG. 3D, a customer 300 may be at a retail store and selected an entitlement card in the form of a gift card or other packaging. At a sales terminal, the customer 300 may present the inactive entitlement card to be activated. The customer 300 can indicate desired benefits and those benefits may be activated and associated with the card by the sales terminal. The card may be swiped or otherwise have its inactive token information obtained. Then, a request from the sales terminal 340 to the order management system 315 may be accomplished, for example, via a token activation API where the request includes the token information and the benefits information requested by the customer. The order management system 315 can return an indication that the entitlement card is activated for the requested benefits, and the customer 300 can receive the entitlement card with the now active token.

Figure 4:
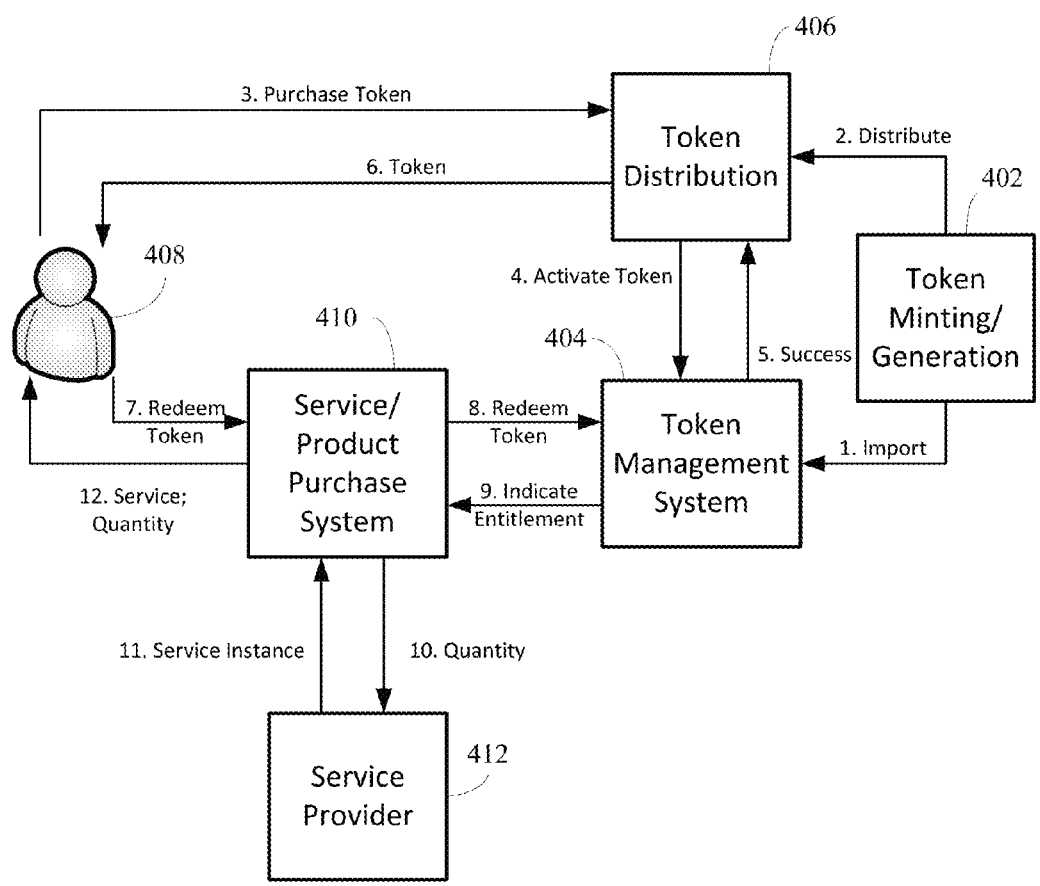
FIG. 4 shows a first example process flow diagram of an environment implementing an on-demand custom entitlement card.
Figure 5:
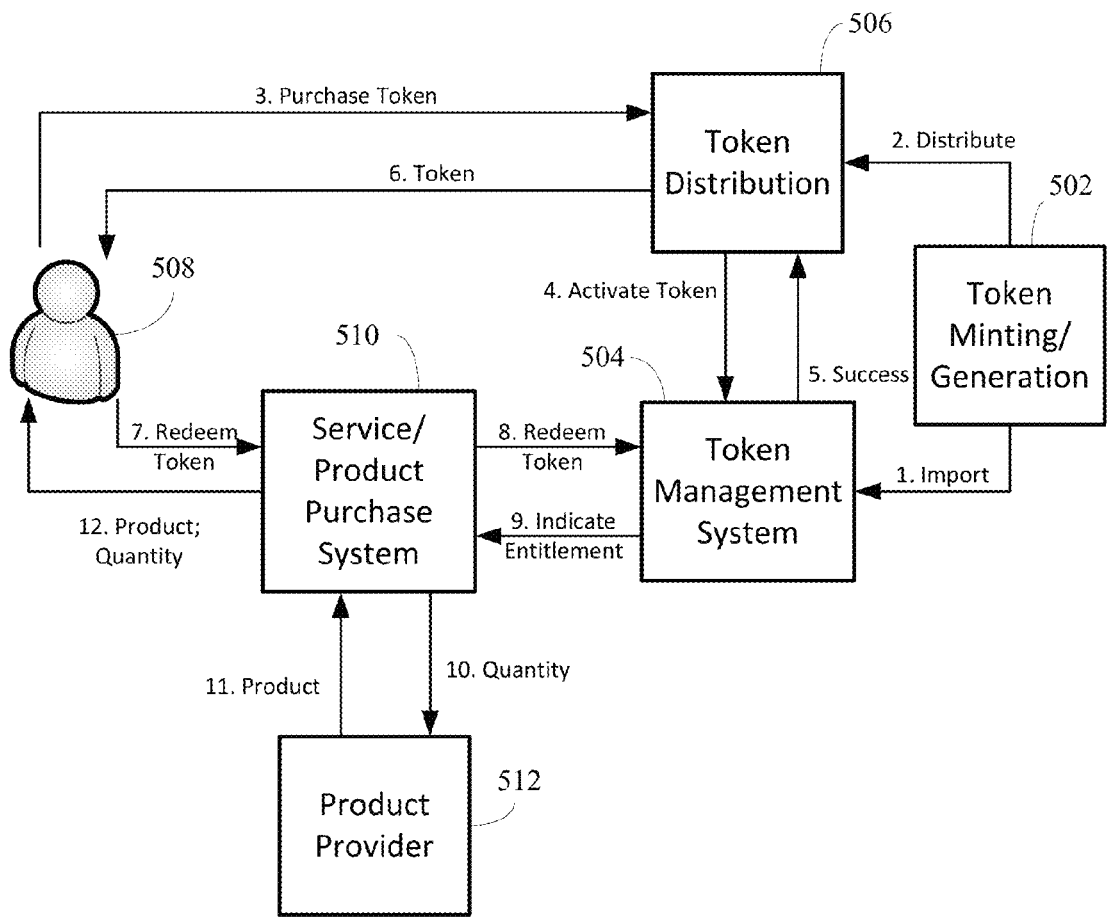
FIG. 5 shows a second example process flow diagram of an environment implementing an on-demand custom entitlement card.
Figure 6:
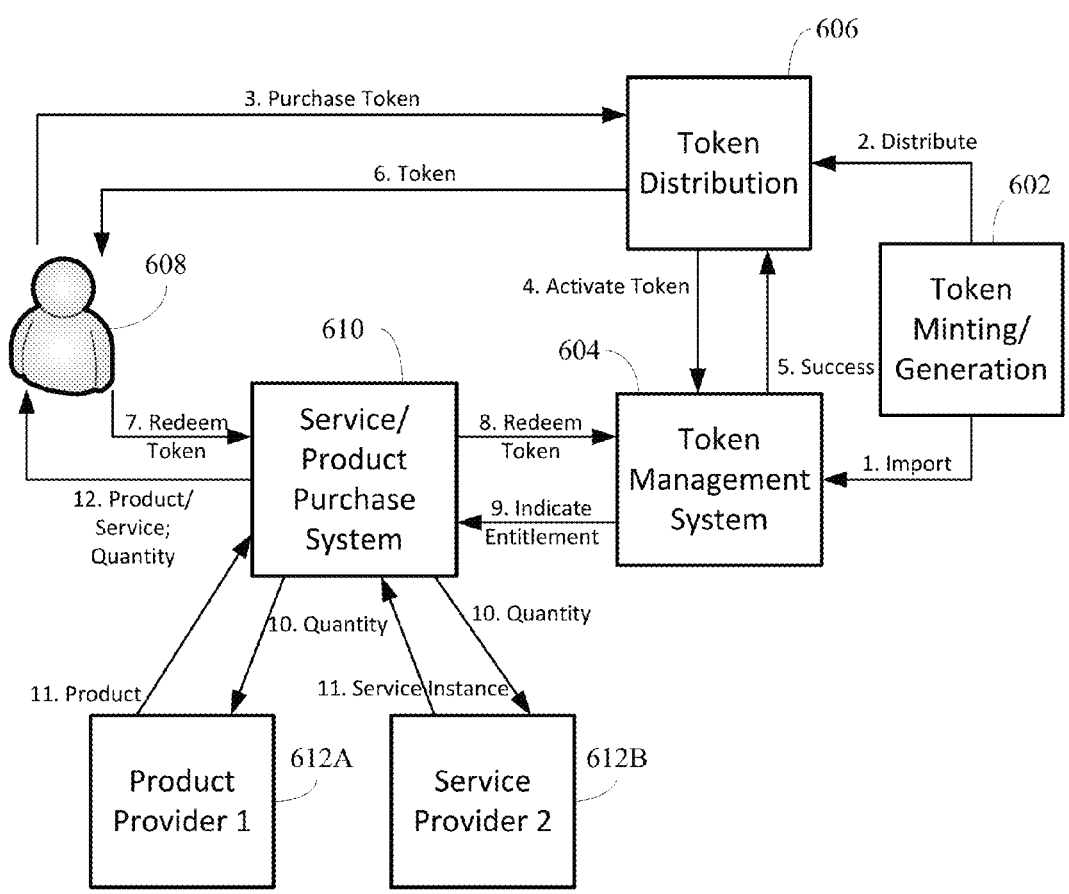
FIG. 6 shows a third example process flow diagram of an environment implementing an on-demand custom entitlement card.

FIGS. 4-6 show example process flow diagrams of environments implementing an on-demand custom entitlement card.

In general, various implementations involve generating and distributing tokens in inactive state; exposing APIs for token activation along with dynamic assignment of quantity; service or product desired by the customer on behalf of other customer; and allowing customer or someone on behalf of the customer to redeem token for service or product and quantity purchased.

Referring to the process flow diagram shown in FIG. 4, tokens may be generated. This process is also referred to as "minting" because the token generator 402 creates number and/or letter keys. Once generated, the generated tokens may be imported (step 1) into a token management system 404 in an inactive state. In addition to being imported into the token management system in the inactive state, the same tokens are sent to a token distribution system 406 for distribution (step 2) to the customers directly or to distributors and resellers who can purchase tokens on behalf of the customer. Although importation and distribution are shown with numerals 1 and 2, these steps may be carried out in parallel. In some cases, the distribution may even occur at the point of sale (e.g., with step 3).

Implementations of the entitlement cards enable a customer 408 or a distributor or reseller on behalf of the customer to purchase a product key in the form of a token (step 3) and specify the benefits they would like to associate with the token. The platform of the product key may be an entitlement card.

According to the implementation illustrated in FIG. 4, the service, number of subscriptions, and length of time may all be independently set at the time of purchase as opposed to having preset entitlement values.

The Token distribution system 406 then activates the token (step 4) via the token management system 404 to associate the service and the quantity (and length of time) requested by the customer with the token in the token management system 404. The token management system 404 can return a success or error code (step 5) back to the token distribution system 406.

Upon successful activation of the token (indicated in step 5), the token distribution system 406 returns the token (step 6) to the customer 408. This token is now associated with the benefit (e.g., service, quantity, time and the like) requested by the customer 408 (or distributor or reseller acting on behalf of the customer).

The customer 408 (or distributor or reseller action on behalf of the customer) now in possession of an active token, may redeem the token (step 7) at a service or product purchase system 410. The service or product purchase system 410 may be available through an online portal. The person redeeming a token may access the service or product purchase system 410 through the online portal.

The service or product purchase system 410 in turn redeems the token (step 8) from the token management system 404. Upon successful redemption, the token management system 404 returns the benefit information (step 9) that was earlier used when the token was activated in steps 3-6. In addition, once the indication of activation of the associated benefit is received, the service or product purchase system 410 routes (step 10) the request to the appropriate service provider 412 along with the quantity (and any other parameter) associated with the token. The service provider 412 provisions the service (step 11) for the given quantity of licenses. The purchase system 410 then returns (step 12) the service instance back to the customer 408 to use as per the specifications of the service. The customer now has access to the requested benefit.

Similar to that described with respect to FIG. 4, for the environment shown in FIG. 5, tokens may be generated (for example, by a token generator 502) and imported into a token management system 504 in an inactive state (step 1). In addition to being imported into the token management system in the inactive state, the same tokens are sent to a token distribution system 506 for distribution (step 2) to the customers directly or to distributors and resellers who can purchase tokens on behalf of the customer. Although importation and distribution are shown with numerals 1 and 2, these steps may be carried out in parallel. In some cases, the distribution may even occur at the point of sale (e.g., with step 3).

A customer 508 or distributor or reseller on behalf of the customer may purchase a product key in the form of a token (step 3) and specify the benefits they would like associated with the token. The platform of the product key may be an entitlement card.

According to the implementation illustrated in FIG. 5, the product, amount, and time (if provided as a subscription or as a periodic distribution of a consumable item such as a magazine) may all be independently set at the time of purchase as opposed to having preset entitlement values.

The Token distribution system 506 then activates the token (step 4) via the token management system 504 to associate the product and the quantity (and time) requested by the customer with the token in the token management system 504. The token management system 504 can return a success or error code (step 5) back to the token distribution system 506.

Upon successful activation of the token (indicated in step 5), the token distribution system 506 returns the token (step 6) to the customer 508. This token is now associated with the benefit (e.g., product, quantity, time and the like) requested by the customer 508 (or distributor or reseller acting on behalf of the customer).

The customer 508 (or distributor or reseller action on behalf of the customer) now in possession of an active token, may redeem the token (step 7) at a service or product purchase system 510. The service or product purchase system 510 may be available through an online portal. The person redeeming a token may access the service or product purchase system 510 through the online portal.

The service or product purchase system 510 in turn redeems the token (step 8) from the token management system 504. Upon successful redemption, the token management system 504 returns the associated benefit (step 9) that was earlier used when the token was activated in steps 3-6. In addition, once the indication of activation of the associated benefit is received, the service or product purchase system 510 routes (step 10) the request to the appropriate product provider (512) along with the quantity associated with the token. The product provider 512 allows access to the product (step 11) for the quantity specified in the request. The purchase system 510 then returns (step 12) the product details back to the customer 508 to use as per the specifications of the service or product. The customer now has access to the requested benefit.

For the example shown in FIG. 6, a similar process is carried out whereby tokens may be generated (for example, by a token generator 602) and imported into a token management system 604 in an inactive state (step 1). In addition to being imported into the token management system in the inactive state, the same tokens can be sent to a token distribution system 606 for distribution (step 2) to the customers directly or to distributors and resellers who can purchase tokens on behalf of the customer. Although importation and distribution are shown with numerals 1 and 2, these steps may be carried out in parallel. In some cases, the distribution may even occur at the point of sale (e.g., with step 3).

A customer 608 or distributor or reseller on behalf of the customer may purchase a product key in the form of a token (step 3) and specify the benefits they would like associated with the token. The platform of the product key may be an entitlement card.

According to the implementation illustrated in FIG. 6, a single token may be obtained for both a product and a service (as well as specified corresponding quantities and time).

The Token distribution system 606 then activates the token (step 4) via the token management system 604 to associate the requested product and service with the token in the token management system 604. The token management system 604 can return a success or error code (step 5) back to the token distribution system 606.

Upon successful activation of the token (indicated in step 5), the token distribution system 606 returns the token (step 6) to the customer 608. This token is now associated with the benefit (e.g., service, product, quantity, time and the like) requested by the customer 608 (or distributor or reseller acting on behalf of the customer).

The customer 608 (or distributor or reseller action on behalf of the customer) now in possession of an active token, may redeem the token (step 7) at a service or product purchase system 610. The service or product purchase system 610 may be available through an online portal. The person redeeming a token may access the service or product purchase system 610 through the online portal.

The service or product purchase system 610 in turn redeems the token (step 8) from the token management system 604. Upon successful redemption, the token management system 604 returns (a validation of) the associated benefit (step 9) that was earlier used when the token was activated in steps 3-6. In addition, once the indication or activation of the associated benefit is received, the service or product purchase system 610 routes (step 10) the request to the appropriate product provider (612A) and service provider (612B). The product provider 612A allows access to the product (step 11) for the quantity specified in the request and the service provider 612B provisions the service (step 11) for the given quantity of licenses. The purchase system 610 then returns (step 12) the service instance and the product details back to the customer 608 to use as per the specifications of the service or product. The customer now has access to the requested benefit.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Carrier waves and other propagating signals that may contain data usable by a computer system are not themselves "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Example scenarios have been presented to provide a greater understanding of certain embodiments of the present invention and of its many advantages. The example scenarios described herein are simply meant to be illustrative of some of the applications and variants for embodiments of the invention. They are, of course, not to be considered in any way limitative of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A computer-implemented method for facilitating product key assignment for an entitlement, comprising:
    importing an inactive key from a token generator to a token management system, wherein the inactive key has no assigned product or service;
    receiving the inactive key at a token distribution system, the inactive key being generated by the token generator and sent to the token distribution system in addition to being imported into the token management system;
    receiving a request, at the token distribution system, for activating a custom entitlement product key identified by the inactive key, communicating the request to the token management system, the request comprising benefits to a redeemer; and
    in response to receiving the request, identifying, at the token management system, the inactive key corresponding to the custom entitlement product key and assigning the benefits to the custom entitlement product key to activate the custom entitlement product key in preparation of a future redemption of the benefit.

2. The method of claim 1, wherein the benefits to the redeemer comprise a specified product and quantity of the product.

3. The method of claim 1, wherein the benefits to the redeemer comprise a specified service, number of licenses and length of time.

4. The method of claim 1, wherein the benefits to the redeemer comprise a specified service, number of licenses for the service and length of time of the service; and a specified product and quantity of the product.

5. The method of claim 1, wherein the request further comprises the custom entitlement product key.

6. The method of claim 1, further comprising:
    generating the custom entitlement product key as an inactive key having no assigned product or service before assigning the benefits to the custom entitlement product key.

7. The method of claim 1, wherein the custom entitlement product key is inactive and not assigned until receiving the request for activating.

8. The method of claim 1, wherein the custom entitlement product key is not previously assigned to a particular product or service.

9. One or more computer-readable storage media comprising instructions that, when executed, cause a system to:
    receive an inactive key at a token distribution system, the inactive key being generated by a token generator and sent to the token distribution system;
    receive a benefit request, at the token distribution system, for a custom entitlement card associated with the inactive key, the token distribution system communicating the benefit request to a token management system also having the inactive key generated by the token generator, wherein the benefit request comprises a benefit and the inactive key; and
    activate the custom entitlement card by requesting the token management system to identify the inactive key and assign the benefit to the inactive key in preparation of a future redemption of the benefit, wherein the inactive key has no assigned product or service before the benefit is assigned.

10. The media of claim 9, wherein the benefit comprises a specified product and quantity of the product.

11. The media of claim 9, wherein the benefit comprises a specified service, number of licenses and length of time.

12. The media of claim 9, wherein the benefit comprises a specified service, number of licenses for the service and length of time of the service; and a specified product and quantity of the product.

13. The media of claim 9, wherein the requesting the token management system comprises calling the token management system via a token activation application programming interface.

* * * * *